(12) United States Patent
Hodgson et al.

(10) Patent No.: US 10,933,328 B2
(45) Date of Patent: Mar. 2, 2021

(54) METHOD AND APPARATUS FOR ENHANCING A GAMING EXPERIENCE

(71) Applicant: PlayFusion Limited, Cambridge (GB)

(72) Inventors: Riaan Hodgson, Hannington (GB);
David Gomberg, New York, NY (US);
Mark Gerhard, Waresley (GB)

(73) Assignee: PLAYFUSION LIMITED, Cambridge (GB)

( * ) Notice: Subject to any disclaimer, the term of this patent is extended or adjusted under 35 U.S.C. 154(b) by 112 days.

(21) Appl. No.: 15/919,656

(22) Filed: Mar. 13, 2018

(65) Prior Publication Data
US 2018/0214776 A1    Aug. 2, 2018

Related U.S. Application Data

(60) Division of application No. 15/637,474, filed on Jun. 29, 2017, which is a continuation of application No. PCT/US2016/020076, filed on Feb. 29, 2016.
(Continued)

(51) Int. Cl.
*A63F 13/65* (2014.01)
*A63F 13/323* (2014.01)
(Continued)

(52) U.S. Cl.
CPC .............. *A63F 13/65* (2014.09); *A63F 13/21* (2014.09); *A63F 13/245* (2014.09); *A63F 13/25* (2014.09);
(Continued)

(58) Field of Classification Search
CPC ...... A63F 13/65; A63F 13/245; A63F 13/323; A63F 13/25; A63F 13/21; A63F 13/98; A63F 2300/8082
See application file for complete search history.

(56) References Cited

U.S. PATENT DOCUMENTS 9,555,326 B2 * 1/2017 Scott ..................... A63F 13/235
2013/0257899 A1 10/2013 Baron et al.
(Continued)

FOREIGN PATENT DOCUMENTS

EP   0744199 A2   11/1996
JP   09047575 A   2/1997
(Continued)

OTHER PUBLICATIONS

European Office Action issued in corresponding European Patent Application No. 16759321.9, dated Dec. 20, 2019, pp. 1-7, Munich, Germany.
(Continued)

*Primary Examiner* — Kang Hu
*Assistant Examiner* — Thomas H Henry
(74) *Attorney, Agent, or Firm* — Hauptman Ham, LLP (57) ABSTRACT

A method includes communicatively coupling a physical object with a body. One or more of the body or the physical object has connectivity to a computer having a processor. The method also includes detecting a sound determined to match an audio fingerprint. The method further includes setting a function of the physical object based on the audio fingerprint. The method additionally includes generating a virtual representation of the physical object and the body in a virtual reality viewable by way of a display associated with the computer. Generating the virtual representation of the physical object and the body includes orienting a virtual version of the physical object with respect to a virtual version of the body. The method also includes causing the virtual version of the physical object to be usable in accordance with the function of the physical object.

20 Claims, 4 Drawing Sheets

Related U.S. Application Data (60) Provisional application No. 62/126,738, filed on Mar. 2, 2015.

(51) Int. Cl.
*A63F 13/245* (2014.01)
*A63F 13/21* (2014.01)
*A63F 13/25* (2014.01)
*A63F 13/98* (2014.01)

(52) U.S. Cl.
CPC ............ *A63F 13/323* (2014.09); *A63F 13/98* (2014.09); *A63F 2300/8082* (2013.01)

(56) References Cited

U.S. PATENT DOCUMENTS

| | | |
|---|---|---|
| 2014/0121008 A1 | 5/2014 | Canessa |
| 2014/0179446 A1 | 6/2014 | Zuniga et al. |
| 2014/0232816 A1 | 8/2014 | Wilson et al. |
| 2015/0306340 A1 | 10/2015 | Giap et al. |
| 2016/0054799 A1* | 2/2016 | Levesque ............... G06F 3/041 345/173 |

FOREIGN PATENT DOCUMENTS

| | | |
|---|---|---|
| JP | 2005034394 A | 2/2005 |
| JP | 2008104771 A | 5/2008 |
| JP | 2011004820 A | 1/2011 |
| JP | 2013000581 A | 1/2013 |
| WO | 2013183328 A1 | 12/2013 |

OTHER PUBLICATIONS

Japanese Office Action issued in corresponding Japanese Patent Application No. 2017-546166, dated Aug. 28, 2018, pp. 1-9.
Japanese Office Action issued in corresponding Japanese Patent Application No. 2017-546166, dated Dec. 25, 2018, pp. 1-8.
Korean Office Action issued in corresponding Korean Patent Application No. 10-2017-7025604, dated Oct. 24, 2018, pp. 1-37.
Korean Office Action issued in corresponding Korean Patent Application No. 10-2017-7025604, dated Apr. 25, 2019, pp. 1-6.

* cited by examiner

METHOD AND APPARATUS FOR ENHANCING A GAMING EXPERIENCE

PRIORITY

The present application is a divisional application of U.S. patent application Ser. No. 15/637,474, filed Jun. 29, 2017, which is a By-Pass Continuation Application of International PCT Application No. PCT/US16/20076, filed Feb. 29, 2016, which claims priority to U.S. Provisional Patent Application No. 62/126,738, filed Mar. 2, 2015, the entireties of which are incorporated herein in their entireties.

BACKGROUND

Game developers and toy manufacturers are continually challenged to develop new and interesting ways for users to interact with games and toys. Some games, such as video games, often involve the portrayal of characters in a virtual world. Users typically control and/or develop characters in a context of a game via interaction with a game controller such as a control pad or joystick.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation or position of a first feature over or on a second feature in the description that follows may include embodiments in which the first and second features are formed or positioned in direct contact, and may also include embodiments in which additional features may be formed or positioned between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of an apparatus or object in use or operation in addition to the orientation depicted in the figures. The apparatus may be otherwise oriented (rotated 90 degrees or at other orientations) and the spatially relative descriptors used herein may likewise be interpreted accordingly.

Figure 1:
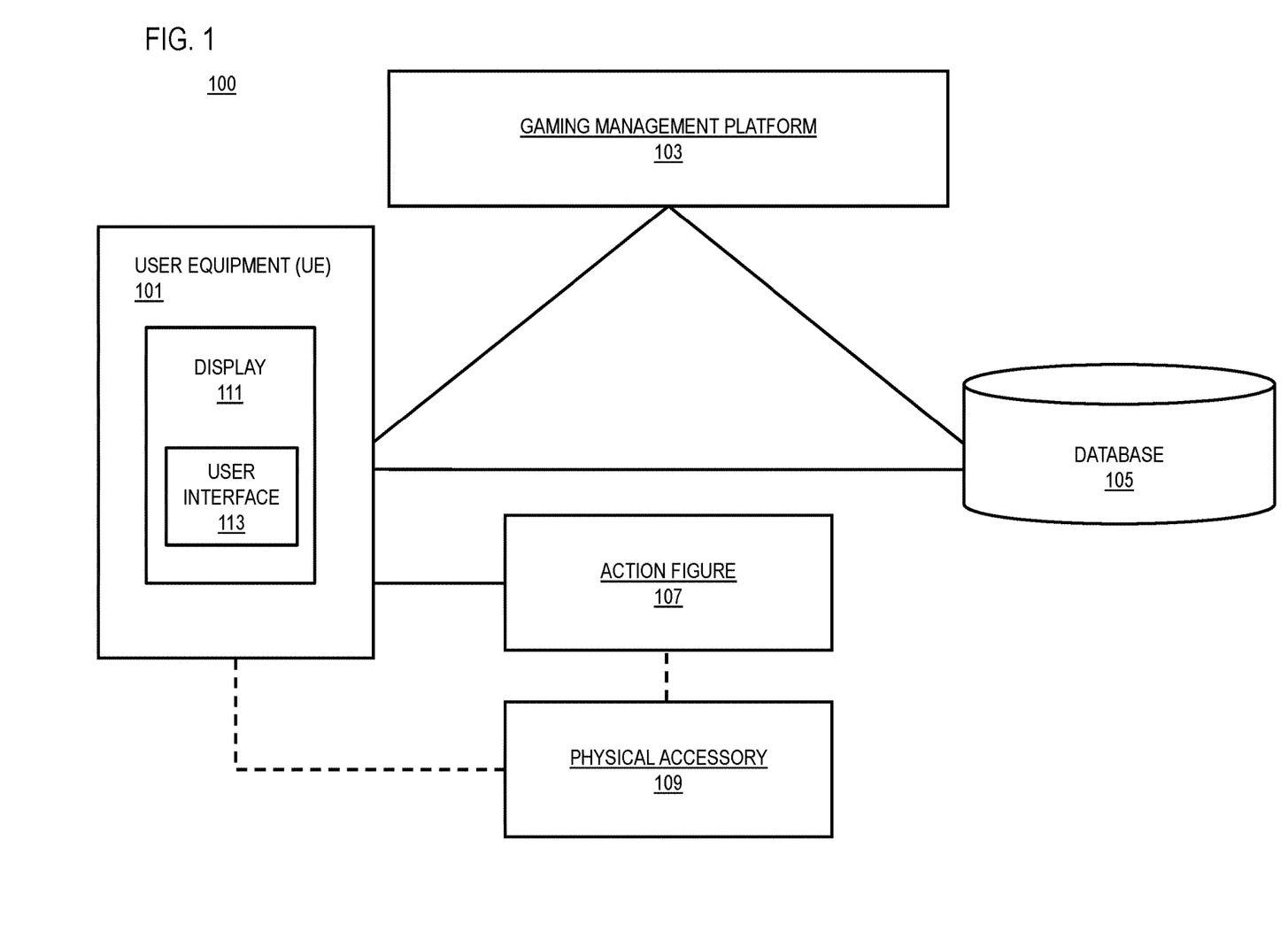
FIG. 1 is a diagram of a gaming system, in accordance with some embodiments.

FIG. 1 is a diagram of a gaming system 100, in accordance with one or more embodiments. In some embodiments, the gaming system 100 makes it possible for a user to control a virtual version of a real-world, physical object, represented in a virtual reality environment, and for the user to receive feedback by way of the real-world physical object based on events that occur in the virtual reality environment. The gaming system 100 is capable of providing connectivity between one or more host devices and one or more interactive devices such as action figures and/or action figure accessories. One or more of the host devices of the system 100 are configured to run computer-readable instructions associated with, or at least display, a virtual reality environment. In some embodiments, the virtual reality environment is in the context of a video game. The gaming system 100 makes it possible for a user to interact with a virtual character represented in the virtual reality environment using the one or more interactive devices.

As shown in FIG. 1, the gaming system 100 comprises a user equipment (UE) 101 having connectivity to a gaming management platform 103, a database 105, and an action figure 107. The action figure 107 is capable of being communicatively coupled with a physical accessory 109 that is usable in a context of the virtual reality environment. If the physical accessory 109 is communicatively coupled with the action figure 107, then the UE 101 is indirectly communicatively coupled with the physical accessory 109. In some embodiments, the physical accessory 109 is optionally directly communicatively coupled with the UE 101.

The UE 101, the gaming management platform 103, the database 105, the action figure 107, and the physical accessory 109 are modular components of a special purpose computer system. In some embodiments, one or more of the UE 101, the gaming management platform 103, and the database 105 are unitarily embodied in the UE 101. The UE 101, accordingly, comprises a processor by which the gaming management platform 103 is executed. In some embodiments, one or more of the UE 101, the gaming management platform 103, the database 105, the action figure 107, and/or the physical accessory 109 are configured to be located remotely from each other. By way of example, the UE 101, the gaming management platform 103, the database 105, the action figure 107, and/or the physical accessory 109 communicate by wired or wireless communication connection and/or one or more networks, or combination thereof.

The UE 101 is a type of mobile terminal, fixed terminal, or portable terminal including a desktop computer, laptop computer, notebook computer, netbook computer, tablet computer, wearable circuitry, mobile handset, server, gaming console, or combination thereof. The UE 101 comprises a display 111 by which a user interface 113 is displayed. In some embodiments, the user interface 113 additionally or alternatively comprises an audio interface or an interface that interacts with a user via a haptic response. In some embodiments, the UE 101 is configured to detect and be communicatively coupled with one or more action figures 107 and/or one or more physical accessories 109. The UE 101 is configured to provide the virtual reality environment.

For example, the UE 101 provides the virtual reality environment by running a video game, hosting a video game, or interacting with a web-based gaming host system or server. The UE 101 is configured to generate a virtual representation of the action figure 107 and/or a virtual representation of the physical accessory 109 in the context of the virtual reality environment or video game. In some embodiments, the UE 101 is configured to use orientation, movement or other sensor data provided by one or more of the action figure 107 or the physical accessory 109 to generate the virtual representation of the action figure 107 and/or the physical accessory 109. In some embodiments, the UE 101 is configured to generate the virtual representation of the action figure 107 and/or the physical accessory 109 free from a platform or scanner to determine an orientation, position or movement of the action figure 107 and/or the physical accessory 109. In some embodiments, the UE 101 is completely free from a physical connection with the action figure 107 and/or the physical accessory 109.

In some embodiments, the UE 101 is configured to detect one or more action figures 107 within a predetermined proximity such as within a room or a preset distance from the UE 101 based on a type of wireless connection used to communicatively couple the action figure 107 with the UE 101. In some embodiments, the UE 101 is configured to be communicatively coupled with the action figure 107 by way of an immediate connection without having to be paired with the action figure 107. For example, if the UE 101 and the action figure 107 are capable of communicating over a proprietary wireless network or a wireless technology such as Bluetooth®, the UE 101 is capable of identifying an action figure 107 with which the UE 101 is configured to be communicatively coupled without additional instruction. In some embodiments, the UE 101 is configured to filter out unknown or undesired action figures 107. In some embodiments, the UE 101 is configured to choose to interact further with a specific action figure 107. In some embodiments, only action figures 107 or physical accessories 109 that are capable of communicating on the proprietary network are capable of interacting with the UE 101, preventing counterfeit products and unsecured access to the UE 101 and/or the gaming management platform 103. In some embodiments, the action figure 107 is configured to detect one or more other action figures 107 or one or more physical accessories 109 within a predetermined proximity. In some embodiments, the action figure 107 is configured to prompt a user to play with the action figure 107 based on a detection of a nearby action figure 107 or physical accessory 109. In some embodiments, the UE 101, the action figure 107 or the physical accessory 109 is configured to detect other action figures 107 or physical accessories 109, and to identify that the action figures 107 and/or physical accessories 109 within the predetermined proximity as being using within a social circle or group. In some embodiments, game related tokens are sharable between users that are included in the social circle or group. In some embodiments, game related tokens are sharable between any users. Game related tokens are capable of being given, traded, lent, or sold to users to cause the virtual version of the action figure 107, the physical accessory 109, or the UE 101 to increase power, strength, add lives, advance levels, unlock characters, unlock a feature, cause an event to occur, or be usable for some other suitable purpose in the context of the virtual reality environment or game. In some embodiments, game related tokens are one or more of physical objects such as physical accessories 109. In some embodiments, game related tokens are virtual points, virtual coins, or some other suitable virtual form capable of being tracked and used in the context of the virtual reality environment or game.

Gaming management platform 103 is a set of computer readable instructions that, when executed by a processor such as a processor 403 (FIG. 4), facilitates the connectivity between the UE 101, database 105, the action figure 107 and/or the physical accessory 109. In some embodiments, the gaming management platform 103 causes information that describes one or more of the physical accessory 109, the action figure 107, the UE 101, interactions thereof, or other suitable information to be stored in the database 105. The gaming management platform 103 is additionally configured to cause an operating or game-related behavioral status or function of one or more of the UE 101, the action figure 107, or the physical accessory 109 to be queried and optionally stored in the database 105. In some embodiments, one or more of the gaming management platform 103 or the UE 101 is configured to query, or issue commands to the action figure 107 and/or the physical accessory 109 to determine the operating or game-related behavioral status, a configuration, or function, of the action figure 107 and/or the physical accessory 109 via one or more application programming interfaces (API's). Similarly, in some embodiments, one or more of the gaming management platform 103 or the UE 101 is configured to change the operating or game-related behavioral status, a configuration, or function, of the action figure 107 and/or the physical accessory 109 via one or more API's.

Database 105 is a memory such as a memory 405 (FIG. 4) capable of being queried or caused to store data associated with the UE 101, the action figure 107, the accessory 109, or a user interaction with the user interface 113.

Action figure 107 is a real-world character or object that has a corresponding virtual version that is capable of being represented in the virtual reality environment provided via the UE 101. Action figure 107 comprises a body and a communication module. In some embodiments, the action figure 107 further comprises one or more of a gyroscope, a magnetometer, an accelerometer, a microphone, a camera, other suitable sensor, an RFID tag, a light source, a power source, a processor, a memory, a speaker, one or more body parts, a vibration device, one or more motors, one or more batteries, one or more power sources, or other suitable component(s).

In some embodiments, one or more of a gyroscope, a magnetometer, an accelerometer, a microphone, a camera, other suitable sensor, an RFID tag, a light source, a power source, a processor, a memory, a speaker, a vibration device, one or more motors, or other suitable component(s) are included in a package of core components configured to be inserted and removed from the action figure 107 as a single unit. For example, if a package of core components comprising sensors, a processor, a memory and/or a communication module is removed from the action figure 107, the action figure 107 is optionally inoperable in the context of the virtual reality environment and/or unable to be controlled via the UE 101. But, if the package of core components is inserted into the action figure 107, the action figure 107 is capable of being activated and usable in the context of the virtual reality environment and/or controlled via the UE 101. A package of core components such as a package of sensors, a processor, a memory and/or a communication module makes it possible to plug and play core control, communication, sensing and/or power source components into and out of a "dumb" action figure 107 to make the "dumb" action figure usable in the context of the virtual reality and/or to be controlled via the UE 101 without the need to manufacture the action figure 107 having each and every component necessary for interaction with the UE 101, or to be usable in the context of the virtual reality environment, as discussed herein.

Sensor data is recorded and communicated to the UE 101 for processing. For example, orientation and movement data collected by the various sensors is usable by the UE 101 to generate a virtual version of the action figure 107 that is oriented in a manner that corresponds to the orientation of action figure 107 in the real world. In some embodiments, the action figure 107 is a humanoid doll or robot having a body, a head, arms and legs.

In some embodiments, sensor data includes orientation data associated with the physical accessory 109 with respect to the action figure 107 such that the virtual version of the physical accessory 109 is represented in the virtual reality environment in a manner that corresponds to the orientation of the physical accessory 109 with respect to the action figure 107 in the real world. In some embodiments, the sensor data is used to control a movement of the virtual version of the action figure 107 and/or the virtual version of the physical accessory 109 in the virtual reality environment. For example, if the action figure 107 is elevated in the real world, sensor data that indicates such a movement is used by the UE 101 and/or the gaming management platform 103 to cause the virtual version of the action figure 107 to jump or fly. In some embodiments, sensor data associated with tilting the action figure 107 is processed by the UE 101 and/or the gaming management platform 103 to cause the virtual version of the action figure 107 to dodge an attack or run, for example.

Physical accessory 109 is a real-world object that is capable of being communicatively coupled with the action figure 107 and that has a corresponding virtual version that is capable of being represented in the virtual reality environment provided via the UE 101. Physical accessory 109 comprises an object and a communication module. In some embodiments, the physical accessory 109 further comprises one or more of a gyroscope, a magnetometer, an accelerometer, a microphone, a camera, other suitable sensor, an RFID tag, a light source, a power source, a processor, a memory, a speaker, a vibration device, one or more motors, one or more batteries, one or more power sources, or other suitable component(s).

In some embodiments, one or more of a gyroscope, a magnetometer, an accelerometer, a microphone, a camera, other suitable sensor, an RFID tag, a light source, a power source, a processor, a memory, a speaker, a vibration device, one or more motors, or other suitable component(s) are included in a package of core components configured to be inserted and removed from the physical accessory 109 as a single unit. For example, if a package of core components comprising sensors, a processor, a memory and/or a communication module is removed from the physical accessory 109, the physical accessory 109 is optionally inoperable in the context of the virtual reality environment and/or unable to be controlled via the UE 101. But, if the package of sensors, a processor, a memory and/or a communication module is inserted into the physical accessory 109, the physical accessory 109 is capable of being activated and usable in the context of the virtual reality environment and/or controlled via the UE 101. A package of core components such as a package of sensors, a processor, a memory and/or a communication module makes it possible to plug and play core control, communication, sensing and/or power source components into and out of a "dumb" physical accessory 109 to make the "dumb" action figure usable in the context of the virtual reality and/or to be controlled via the UE 101 without the need to manufacture the physical accessory 109 having each and every component necessary for interaction with the UE 101, or to be usable in the context of the virtual reality environment, as discussed herein.

In some embodiments, a package of core components is configured to be usable in physical accessories 109 and/or action figures 107 that are of a same or a different type. For example, if a first physical accessory 109 is a car controllable by way of the UE 101, and a second physical accessory 109 is a plane usable in the context of the virtual reality environment, a package of core components is configured to bring the car and the plane to life so to speak, when inserted therein or attached thereto, such that the car is capable of being controlled by the UE 101 or the plane is capable of being used in the context of the virtual reality environment.

Sensor data is recorded and communicated to the UE 101 for processing. For example, orientation and movement data collected by the various sensors is usable by the UE 101 to generate a virtual version of the physical accessory 109 that is oriented in a manner that corresponds to orientation of the physical accessory 109 in the real world. In some embodiments, the physical accessory 109 is a shield, a staff, an ax, a cloak, armor, clothing, a tool, a gun, another weapon, a vehicle, an animal, another action figure, or another suitable object that is capable of being used and communicatively coupled with an action figure 107. In some embodiments, physical accessory 109 is a game card configured to cause one or more of the action figure 107, the virtual version of the action figure, or an event or status in the context of the virtual reality environment to be affected by the presence of the game card within a predetermined proximity of the action figure 107, the UE 101 or another physical accessory 109. In some embodiments, a plurality of game cards and a rotation of the game cards has an effect on the action figure 107, the virtual version of the action figure, or an event or status in the context of the virtual reality environment. For example, in some embodiments if the physical accessory 109 is a game card, then communicative coupling of the game card with the action figure 107 causes a new character to appear in the context of the virtual reality environment. In some embodiments, in some embodiments if the physical accessory 109 is a game card, then communicative coupling of the game card with the action figure 107 causes an event to occur such as earning extra power, lives, reaching a new level or world, earning points, money, extra speed, losing power, losing a life, falling back to a different level, losing points, losing money, losing speed, becoming invincible, or some other suitable event or change in state of the virtual version of the action figure in the context of the virtual reality environment, a change in state of the real life action figure 107 to occur or a change in state of a physical accessory 109 or a virtual version of the physical accessory 109 to occur. In some embodiments, a specific combination of game cards causes a new character, an event or a change in state to occur. In some embodiments, an order of communicative coupling of game cards or physical accessories, whether simultaneously communicatively coupled or individually communicatively coupled at different times causes a new character, an event or a change in state to occur.

In some embodiments, the physical accessory 109 is inactive in a context of a game run by the UE 101 until the physical accessory 109 is communicatively coupled with the action figure 107. In some embodiments, the physical accessory 109 is communicatively coupled with the action figure 107 by a physical connection. In some embodiments, the physical connection is direct. In other embodiments, the physical connection is indirect. In some embodiments, the physical accessory 109 is communicatively coupled with the action figure 107 by a wireless connection.

In some embodiments, a point of attachment or contact position is detected by one or more of the action figure 107 or the physical accessory 109. The point of attachment or contact position is reported to the UE 101. In some embodiments, a function or behavior of the physical accessory 109 is based on the point of attachment or contact position. For example, in a context of a game, a function or behavior of a sword might be different if attached to the action figure 107 in the left hand compared to the right hand. In some embodiments, the function or behavior of the physical accessory 109 is free from being associated with the point of attachment or the contact position. In some embodiments, the function or behavior describes a power level or strength level of the physical accessory 109.

In some embodiments, the action figure 107 is configured to supply power to a physical accessory 109 that is communicatively coupled with the action figure 107. In some embodiments, the action figure 107 is configured to obtain information about a physical accessory 109 that is communicatively coupled with the action figure 107. In some embodiments, the action figure 107 stores the information about the physical accessory 109 in the memory of the action figure 107. In some embodiments, the action figure 107 is configured to communicate the obtained information about the physical accessory 109 to the UE 101. In some embodiments, the action figure 107 is configured to control the physical accessory 109 that is communicatively coupled with the action figure 107. For example, if the physical accessory 109 is a gun, once communicatively coupled with the action figure 107, a user is able to control a virtual representation of the gun in the context of the game using the action figure 107.

In some embodiments, the action figure 107 or the UE 101 is configured to determine an order by which two or more physical accessories 109 are communicatively coupled with the action figure 107. In some embodiments, two or more physical accessories 109 are coupled with the action figure 107 through a bus. In some embodiments, multiple physical accessories 109 are capable of being chained together with one or more of the physical accessories 109 being connected to the action figure 107. By running a serial bus, for example, across all of the connected physical accessories 109, it is possible to determine the identities and order of connection of the multiple physical accessories 109. This is useful, for example, in a situation in which the action figure 107 is communicatively coupled to a physical accessory 109 that is a gun and another physical accessory 109 that is a vehicle. Using the order of coupling, the UE 101 and/or the gaming management platform 103 causes virtual versions of the action figure 107 and the physical accessories 109 to appear is an orientation in the virtual reality environment that corresponds to the order by which the action figure 107 and the physical accessories 109 were coupled in the real world.

In some embodiments, two or more action figures 107 are communicatively coupled with one another. In some embodiments, two action figures 107 are directly coupled with one another. In other embodiments, two action figures 107 are indirectly coupled by way of one or more physical accessories 109. One or more of the coupled action figure 107 is configured to report the communicative coupling between the two or more action figures 107 to the UE 101. This is useful, for example, in situations where action figures 107 are capable of joining forces in the context of the game.

In some embodiments, one or more of the action figure 107 or the physical accessories 109 are encoded with a unique identification code. The unique identification code is a globally unique identifier that is assigned during a manufacturing process of the action figure 107 and/or the physical accessory 109. In some embodiments, the identification code is an encrypted identifier that is changed by the gaming management platform 103 on a predetermined schedule to prevent counterfeiting of action figures 107 and/or physical accessories 109, and to prevent unwanted access to the gaming management platform 103 and/or the UE 101. In some embodiments, the unique identifier is locally encrypted or cloud encrypted. In some embodiments, the unique identifier is encrypted by way of a 128-bit encryption. In some embodiments, the unique identifier is encrypted by way of a 256-bit encryption. In some embodiments, the unique identifier is encrypted by way some other suitable form of encryption or encryption technique.

The action figure 107 is configured to detect the unique identification code of an accessory 109 that is communicatively coupled with the action figure 107. In some embodiments, the action figure 107 communicates the unique identification code to the UE 101. The unique identification code makes it possible for the gaming management platform 103 to identify an action figure 107 and/or a physical accessory 109. Additionally, the unique identification code makes it possible to identify a type of action figure 107 and/or a type of physical accessory 109. Detection and communication of the unique identification code of a physical accessory 109 makes it further possible for the gaming management platform 103 to track unique information or characteristics associated with an action figure 107 and/or a physical accessory 109 such as pairing instances, ownership, trading, selling, and lending of the action figure 107 and/or the physical accessory 109. Additionally, the gaming management platform 103 makes it possible for a relative value of the physical accessory 109 to be stored in the database 105 based on the unique identification code. The relative value, for example, is optionally based on a performance, use, past ownership, scarcity, condition, real world dollars invested in upgrading the virtual performance of the physical accessory 109, or other suitable metric associated with the action figure 107 and/or the physical accessory 109. In some embodiments, pairing instances between the physical accessory 109 and the action figure 107 are stored by the physical accessory 109 in the memory of the physical accessory 109. In other embodiments, pairing instances between the physical accessory 109 and the action figure 107 are stored in the memory of the action figure 107. In some embodiments, pairing instances between the physical accessory 109 and the action figure 107 are communicated to the UE 101 and stored in the database 105.

In some embodiments, the database 105, being a remote database from the action figure 107 and the physical accessory 109, is a global repository of information that is associated with an owner of the action figure 107 and/or the physical accessory 109. Storing information associated with the action figure 107 and/or the physical accessory 109 in the database 105 makes it possible to track ownership of the action figure 107 and/or the physical accessory 109 inside and outside of games. Similarly, storing such information on the memory of the action figure 107 and/or on the memory of the physical accessory 109 makes it possible to track ownership of the action figure 107 and/or the physical accessory inside and outside of game. For example, because the physical accessory 109 is capable of being lent, traded or sold to another person, ownership of the physical accessory 109 (and all of the behaviors, functions, characteristics or operational statuses of the accessory within games) is capable of being transferred. In other words, selling or trading the physical item also results in selling or trading the characteristics of the accessory. For example, if the physical accessory 109 is used or upgraded to the point that the physical accessory becomes the most powerful weapon in the gaming universe, the physical accessory 109 is capable of being traded or sold having all of the power characteristics associated with the physical accessory 109 that makes it the most powerful weapon in all the land.

In some embodiments, the memory in the physical accessory 109 is a persistent memory configured to retain information such as the characteristics of the physical accessory 109 in addition to the unique identification code. Information stored in the memory of the physical accessory 107 is capable of being communicated to an action figure 107 when the physical accessory 109 is communicatively coupled with the action figure 107. In some embodiments, information such as a characteristic of the physical accessory 109 is capable of being communicated to the action figure 107 or the UE 101, even if the action figure 107 and/or the UE 101 do not have access to the database 105 that stores and/or provides information regarding the physical accessories 109. As such, a value or a behavior, characteristic or function of the physical accessory 109 is capable of being checked without having to interface with the gaming management platform 103, the database 105 and/or the UE 101. Similarly, a value or a behavior, characteristic or function of a physical accessory 109 is capable of being transferred to another user without having to interface with the gaming management platform 103, the database 105 and/or the UE 101.

In some embodiments, the action figure 107 and the physical accessory 109 have unique identification codes that are maintained independently from any particular UE 101 or video game that is run by UE 101. The action figure 107 and/or the physical accessory 109 is capable of interacting with multiple different games run by the same UE 101 or with one or more UE 101's at different times. In some embodiments, the action figure 107 and the physical accessory 109 are configured to store characteristics that are interpreted by an active UE 101 or video game run by an active UE 101. Then, if communicatively coupled to interact with another UE 101 or a different video game run by the same UE 101, the action figure 107 and/or the physical accessory 109 is configured to store characteristics that are interpreted by the different UE 101 when the different UE 101 is active, or by the different video game. In other words, the action figure 107 and/or the physical accessory 109 is capable of being used such that the use in one instance with one game is isolated from the use in a different instance with another game. Alternatively, in some embodiments, no matter what game is being run by the UE 101, the characteristics of the action figure 107 and/or the physical accessory 109 are configured to carry forward from UE 101 to UE 101 or from game to game.

In some embodiments, a behavior of the video game is affected by the physical presence and configuration of the action figure 107 and/or the physical accessory 109. For example, if an action figure 107 is holding a physical accessory 109 that is a sword, then a virtual version of that sword will be displayed in the virtual reality environment. In some embodiments, occurrences in the game optionally affect one or more characteristics of the action figure 107 or the physical accessory 109. For example, if extra power is won for the sword accessory during game play, then the UE 101 is configured to cause one or more of the action figure 107 or the physical accessory 109 to reflect the increased power. In some embodiments, the physical accessory 109 comprises one or more light sources, such as a light emitting diode (LED), that are configured to be actuated in response to an instruction received from the UE 101 based on an occurrence in the video game. For example, a light source of the physical accessory 109 is capable of being turned-on if and when the sword accessory has extra power.

In another example, a weapon accessory such as a gun is capable of indicating whether the gun is loaded with ammunition by actuating the light source, and then turning off the light source if the gun is out of ammunition. Similarly, in some embodiments, the action figure 107 optionally includes one or more light sources that are used in conjunction with the video game run by the UE 101 to indicate various statuses of the action figure 107. For example, a light source is optionally actuated to indicate that the action figure 107 is alive in the context of the game. Then, if the action figure 107 is losing power or life in the game, the light source optionally dims or blinks. For example, as an action figure 107 is dying in the context of the game, the light source optionally blinks to represent a slowing heart beat. Alternatively, to indicate a power-up status or an attack mode status, one or more light sources of the action figure light up. In some embodiments, light sources in both the action figure 107 and the physical accessory light up to indicate a status, behavior or occurrence in the context of the game. In some embodiments, to indicate a status, behavior or occurrence, the action figure 107 makes an audible sound that is associated with a game mode or condition of the virtual version of the action figure 107 in the context of the game. For example, if the virtual version of the action figure 107 is caused to be in a "super attack" mode in the context of the game, the UE 101 causes the action figure 107 to scream "super attack!"

In some embodiments, one or more of the action figure 107 or the accessory 109 comprise a vibration device that is capable of providing a haptic response based on an instruction received from the UE 101. For example, if an action figure 107 is "hit" in the context of the video game, the action figure 107 optionally vibrates. In some embodiments, the action figure 107 comprises multiple body parts that are held together by fasteners. In some embodiments, the fasteners are controllable magnets. In response to an event in a game run by the UE 101 in which the virtual version of the action figure 107 loses a body part, such as having an arm or a leg cut off, then the UE 101 causes the fastener attaching the arm or the leg to a body of the action figure 107 to release the arm or the leg in the real world. Similarly, in some embodiments, if the virtual version of the action figure 107 loses or drops the virtual version of the physical accessory 109 in the context of the game run by UE 101, then the UE 101 causes a fastener to release the physical accessory 109 in the real world. For example, if a virtual version of the action figure 107 loses the virtual version of a sword or loses the virtual version of an article of clothing such as a cape in the context of the game during game play, the UE 101 causes a fastener to release the physical accessory 109 in the real world.

In some embodiments, the action figure 107 comprises an audio sensor configured to pick up sounds in a surrounding environment. Such sounds are compared to a pre-established audio fingerprint. If a sound is recognized as matching a pre-established audio fingerprint, then the action figure 107 is configured to respond. For example, if the pre-established audio fingerprint is associated with a television show or a movie, then the action figure 107 is capable of making sounds, vibrating, or initiating a change in the context of a game based on a recognized event in the television show, movie, or video game. For example, if a pre-established audio fingerprint is tied to a movie "X" and a quote is said in the movie, the action figure 107 is caused to respond to the quote by playing a pre-recorded sound effect or verbal response. In some embodiments, the pre-established audio fingerprint is tied to a word or phrase said aloud by a user while interacting with the action figure 107. For example, if the user is determined by the action figure 107, the UE 101, or the gaming management platform 103 to use inappropriate language during game play, then the action figure 107 optionally responds with an instruction to not use such language. In some embodiments, if a user states out loud that the user is going to beat a character or level in the context of the game, the action figure 107 is caused to play audio file that antagonizes the user or prompts the user to try harder.

In some embodiments, the action figure 107 is configured as a receiver, and the processing of the audio content is performed by the UE 101 or gaming management platform 103 remotely. In some embodiments, the action figure 107, the UE 101, and/or the gaming management platform 103 use learning algorithms to analyze and process a user's voice to better recognize the user's speech patterns. In some embodiments, the audio stream is continuously analyzed in real-time. In some embodiments, the audio stream is processed to identify a hash of landmarks to recognize the pre-established audio fingerprint. In some embodiments, the audio stream is processed via a multi-variant search of landmarks using an algorithm to eliminate potential ad hoc and distractive sound peaks. Eliminating potential ad hoc and distractive sound peaks helps to prevent errors when attempting to recognize one or more sounds.

In some embodiments, a recognized pre-established audio fingerprint triggers an event to occur in the video game. For example, if the action figure 107 or the physical accessory 109 recognizes a pre-established audio fingerprint while a television show is playing within range of the action figure 107 or the physical accessory 109, then the action figure 107 or the physical accessory 109 is caused to have extra power in the context of the game. In some embodiments, the extra power is represented by the light source of the action figure 107 or the physical accessory 109. In some embodiments, a user has to be playing the game for the action figure 107 or the physical accessory 109 to be caused to be in the power up mode. But, in other embodiments, as long as the action figure 107 or the physical accessory 109 recognizes the pre-established audio fingerprint, then the action figure 107 or the physical accessory 109 is caused to be in the power up mode, prompting the user to play the game. In some embodiments, the power up mode only lasts for a predetermined period of time after the audio fingerprint is recognized, prompting the user to return to the game within the predetermined period of time. In some embodiments, if a user is prompted to return to a game, and the user starts playing the game, the UE 101, the gaming management platform 103, the action figure 107 or the physical accessory 109 causes a communication such as an email or a text message to be sent to a designated recipient such as a parent to indicate that the game has been initiated.

Other modes or incentives are possible to be caused based on recognition of audio fingerprints such as extra life, free game play, free upgrades to accessories, discounted game play, discounted upgrades to accessories, other weapons, other armor, different vehicles, secret levels, secret features, or other suitable change to the video game. For example, in some embodiments, a recognized pre-established audio fingerprint received by the action figure 107 is communicated to the UE 101 and/or the gaming management platform 103 and unlocks content or has another effect on a video game being run by the UE 101. For example, if a pre-established audio fingerprint is recognized as being associated with a movie "Z," the UE 101 is running a video game that has various levels, and the movie Z is determined to have progressed to a certain point based on the recognized pre-established audio fingerprint, the UE 101 is configured to advance the video game to a next level.

In some embodiments, a recognized pre-established audio-fingerprint causes a change in state or function of an accessory 109. For example, if an accessory 109 is an ax, and based on the pre-established audio fingerprint, an event is recognized that is associated with a magic spell that renders the ax unusable, then the accessory 109 is caused to indicate that the ax is not usable in the context of the game.

In some embodiments, the action figure 107, the physical accessory 109 and/or the UE 101 are configured to collect data regarding a duration of use of the action figure 107, the accessory 109 and/or a UE 101. In some embodiments, the duration of use is based on an amount of time that the action figure 107 is communicatively coupled with the UE 101 and interacting with the video game. In other embodiments, the duration of use is based on how often, or in what ways, an action figure 107 and/or the accessory 109 are paired, moved, played with, manipulated, or other suitable indicator. In some embodiments, a quantity of attachments of an accessory 109 to an action figure 107 are recorded. In some embodiments, location of use is recorded. The recorded usage data is capable of being analyzed by the UE 101, the gaming management platform 103, and/or a service provider to provide insight into user behavior and/or interest in the action figure 107, various accessories 109, video games run by UE 101, or other suitable discoverable metrics.

In some embodiments, the action figure 107 and/or the physical accessory 109 comprises one or more of a temperature sensor, a heart rate sensor, or a skin moisture content sensor to monitor vital signs of a user. In some embodiments, the gaming management platform 103 is configured to measure vital signs of a user to determine if a user is happy, sad, anxious, scared, or excited about a game, the action figure 107, moments in the game, or a type of physical accessory 109. In some embodiments, because the action figure 107 is communicatively coupled with the UE 101, a parent is able to monitor the vital signs of a child from afar. Such monitoring is helpful for situations in which a parent leaves a child with a babysitter for an extended period of time. The action figure 107 makes it possible to provide a passive way to check in on the child's health while away.

Figure 2:
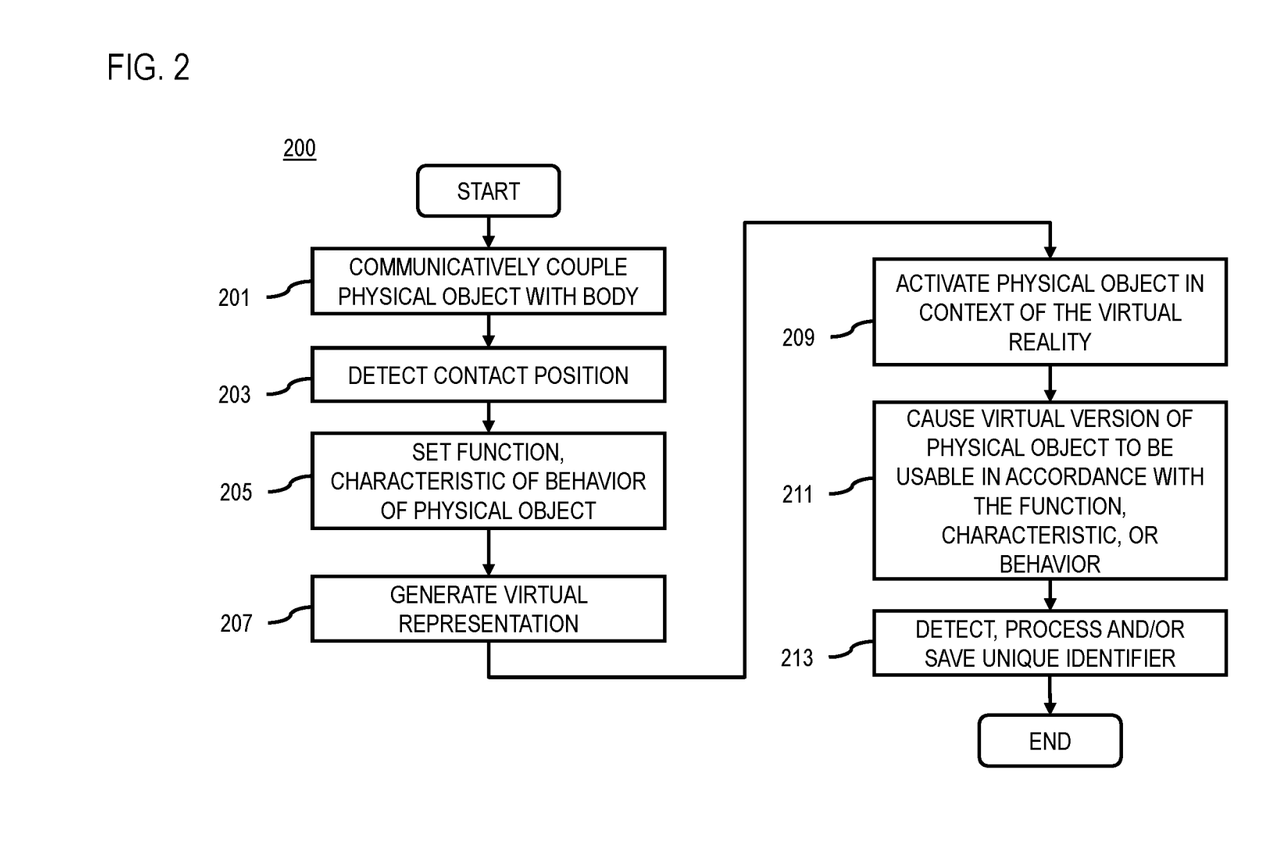
FIG. 2 is a flowchart of a method of facilitating interactions between an action figure, a physical accessory, and a virtual reality, in accordance with some embodiments.

FIG. 2 is a flowchart of a method 200 of facilitating interactions between an action figure such as action figure 107 (FIG. 1), a physical accessory such as physical accessory 109 (FIG. 1), and a virtual reality environment such as a video game run by a UE 101 (FIG. 1), in accordance with one or more embodiments.

In step 201, a physical object such as a physical accessory 109 is communicatively coupled with a body such as an action figure 107 or a portion thereof. One or more of the body or the physical object has connectivity to a computer having a processor, such as UE 101. In some embodiments, the body supplies power to the physical object based on the communicative coupling of the physical object with the body. In some embodiments, communicatively coupling the physical object comprises physically connecting the physical object to the body. In some embodiments, communicatively coupling the physical object with the body comprises wirelessly connecting the physical object with the body.

In step 203, one or more of the body, the physical object, or the computer, detects a contact position between the physical object and the body. If the physical object is wirelessly communicatively coupled with the body, the contact position is based on a proximity of the physical object to the body. In some embodiments, for example, the body is configured to detect if the physical object is positioned on a right side, a left side, above, below, in front of, or behind, the body.

In step 205, one or more of the computer, the body, or the physical object causes a function, characteristic, or behavior of the physical object to be set based on the contact position.

In step 207, the computer generates a virtual representation of the physical object and the body in a virtual reality viewable by way of a display associated with the computer. In some embodiments, the virtual reality is a video game environment. In some embodiments, the computer hosts or runs video game software that produces the video game environment. The virtual representation of the physical object and the body includes orienting a virtual version of the physical object with respect to a virtual version of the body based on the contact position. In some embodiments, the virtual version of the physical object and/or the virtual version of the body are caused by the computer to move in the virtual reality based on a movement of the physical object and/or the body in the real world. For example, if the body is lifted in the real world, in some embodiments, the virtual version of the body is caused to jump or fly in the virtual reality.

In step 209, the computer activates the physical object in a context of the virtual reality based on the communicative coupling. In some embodiments, the physical object is inactive in the context of the virtual reality unless the physical object is communicatively coupled with the body. In some embodiments, the computer or the body causes an indicator associated with the physical object to indicate the physical object is active in the context of the virtual reality. In some embodiments, the indicator is a light source of the physical object.

In step 211, the computer causes the virtual version of the physical object to be usable in accordance with the function of the physical object. For example, if the physical object is determined to have a contact position that is in a right hand of the body, then the UE 101 causes the virtual version of the physical object to be usable in the context of the virtual reality in accordance with a function, characteristic, or behavior associated with holding the physical object in the right hand of the body. In some embodiments, holding the physical object in the left hand optionally has a different function, characteristic, or behavior. For example, if the physical object is a pair of conventional scissors that only works when used by the right hand, the UE 101 causes the virtual version of physical object to behave accordingly.

In some embodiments, multiple physical objects are communicatively coupled with the body. In other embodiments, multiple bodies are communicatively coupled with the physical object. In further embodiments, multiple bodies are communicatively coupled with multiple physical objects.

For example, in some embodiments, the physical object is a first physical object of at least two physical objects and the contact position is a first contact position. Like the first physical object, the second physical object is communicatively coupled with the body, a second contact position between the second physical object and the body is detected, a function of the second physical object is set based on the second contact position, and a virtual representation of the second physical object in the virtual reality is generated. The virtual representation of the second physical object includes orienting a virtual version of the second physical object with respect to the virtual version of the body and the virtual version of the first physical object based on the second contact position of the second physical object with the body. The virtual version of the second physical object, like the virtual version of the first physical object, is caused to be usable in accordance with the function of the second physical object. One or more of the function of the first physical object or the function of the second physical object is further based on an order by which the first physical object and the second physical object are communicatively coupled with the body.

In some embodiments, the body is a first body of at least two bodies and the contact position is a first contact position. Similar to the first body, the second body is communicatively coupled with one or more of the first body or the physical object, a second contact position between the second body and the first body or the second body and the physical object is detected, and a function of the first body and/or the second body is set and/or the function of the physical object is modified based on the second contact position. The computer generates a virtual representation of the second body in the virtual reality. The virtual representation of the second body includes orienting a virtual version of the second body with respect to the virtual version of the first body and the virtual version of the physical object based on the second contact position. The computer then causes the virtual version of the first body to be usable in accordance with the function of the first body, causes the virtual version of the second body to be usable in accordance with the function of the second body, and/or causes the virtual version of the physical object to be usable in accordance with the modified function of the physical object, in the context of the virtual reality. One or more of the function of the first body, the function of the second body, or the function of the physical object is further based on an order by which the first body, the second body, and the physical object are communicatively coupled with the first body.

In some embodiments, the body is a digital action figure having a role in a video game environment, and the physical object is an accessory having a use in the video game environment. In some embodiments, the accessory is controlled using the body, and the computer causes the virtual version of the physical object to be controlled based on the control of the accessory using the body. In other words, a control or manipulation of the body and/or the accessory in the real world is sensed and causes a change in state of the virtual version of the body and/or the virtual version of the physical object in the virtual world. In some embodiments, a change in state of the virtual version of the physical object or a change in state of the virtual version of the body in the virtual world causes a change in state of the physical object or a change in state of the body in the real world. For example, if a virtual version of the physical object is rendered powerless in the context of the virtual reality, then the physical object is optionally caused to indicate that the physical object is not usable in the context of the game (e.g., the accessory is out of ammo, magic spell, dropped, or other suitable gaming scenario).

In step 213, the body detects a unique identifier describing the physical object, and the body communicates the unique identifier to the computer. The computer uses the unique identifier to recognize a type of physical object, a characteristic of the physical object, and causes the function of the physical object to be further based on the characteristics associated with the unique identifier. For example, the computer is configured process the unique identifier to determine if the physical object is an accessory representing a laser gun compared to an accessory representative of an M-16 machine gun that is half-way out of ammunition. In some embodiments, the computer causes one or more of the unique identifier, the characteristics, or ownership information associated with the physical object to be stored in a memory such as database 105 (FIG. 1). In some embodiments, the body is associated with a unique identifier describing the body, the type of body, a characteristic of the body, or a condition of the body. In some embodiments, the computer detects, processes, and/or saves data associated with the body based on the unique identifier.

Figure 3:
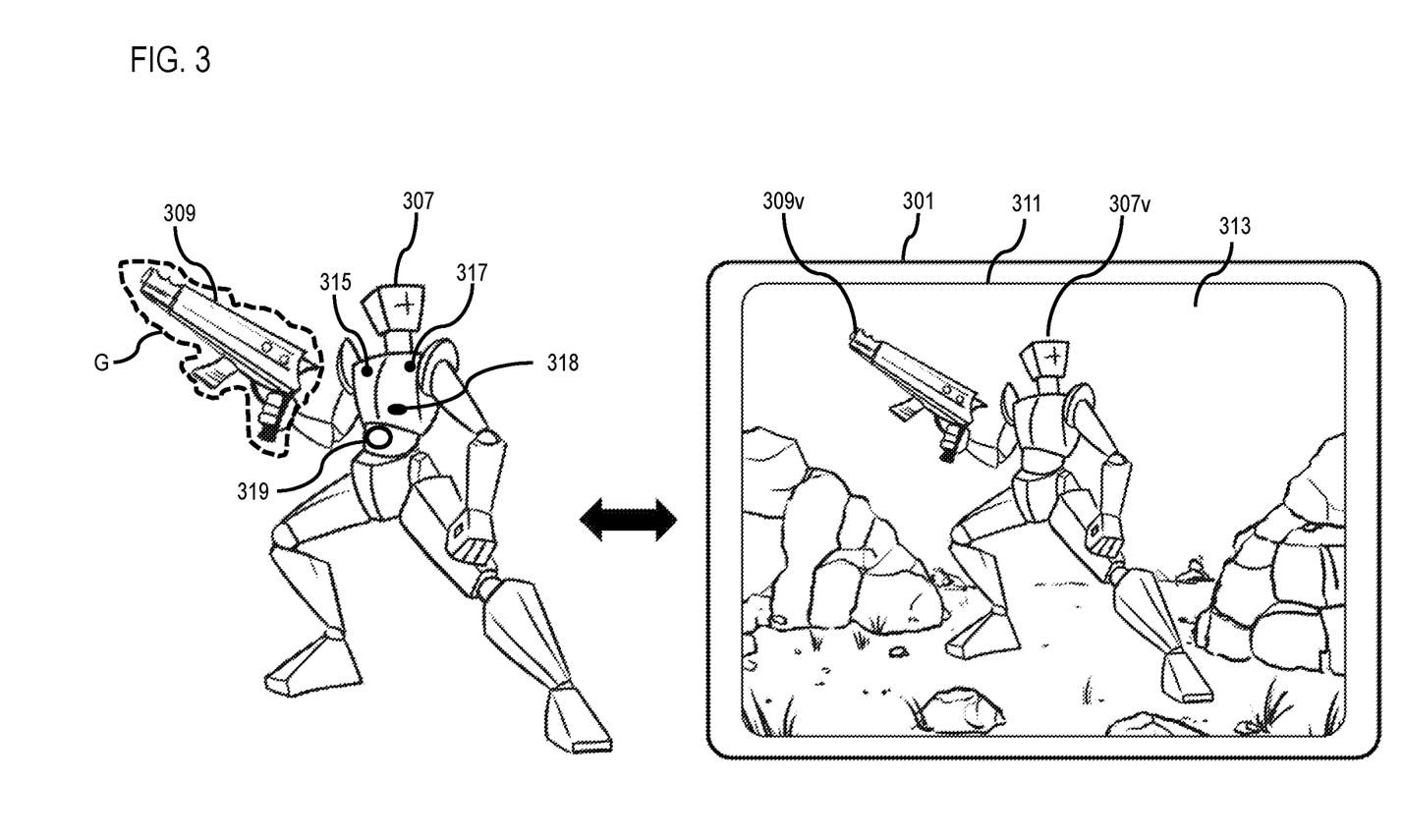
FIG. 3 is a diagram of an action figure, a physical accessory, a virtual version of the action figure, and a virtual version of the physical accessory, in accordance with some embodiments.

FIG. 3 is a diagram of a UE 301, an action figure 307, a physical accessory 309, a display 311, and a user interface 313, in accordance with one or more embodiments. UE 301, action figure 307, physical accessory 309, display 311, and user interface 313 are similar to the features described with respect to FIG. 1, with the reference numerals increased by 200. The action figure 307 and the UE 301 are communicatively coupled by a two-way communication.

UE 301 is running a video game that is viewable by way of the display 311. A user interacts with the video game by way of the action figure 307 and/or user interface 313. The user interface 313 comprises a virtual version of the action figure 307v and a virtual version of the physical accessory 309v. In this example, the physical accessory 309 is held in the right hand of the action figure 307. The virtual version of the action figure 307v shown in the user interface 313 is holding the virtual version of the physical accessory 309v in the right hand. The UE 301 causes the virtual version of the physical accessory 309v to be oriented with respect to the virtual version of the action figure 307v in the user interface 313 based on sensor data received from the action figure 307 and/or the physical accessory 309.

Based on one or more occurrences in the game run by UE 301, the UE 301 communicates commands to the action figure 307 and/or the physical accessory 309. The commands communicated to the action figure 307 and/or the physical accessory 309 cause the action figure 307 and/or the physical accessory 309 to react in a way that reflects the occurrence in the game. For example, based on a change in status or function of the virtual version of the action figure 307v and/or the virtual version of the physical accessory 309v in the context of the game, the UE 301 communicates a command to cause the physical accessory 309 to glow G (e.g., actuating the light source of the physical accessory 309), to indicate the change in status or function of the virtual version of the action figure 307v and/or the virtual version of the physical accessory 309v.

In some embodiments, the action figure 307 comprises audio sensors 315 or video sensors 317 to pick up audio or video content. The action figure 307 is configured to compare and analyze the audio and/or video content and to communicate the results to the UE 301 to effect a change in one or more of the game, the action figure 307 or the physical accessory 309. Alternatively, the action figure 307 does not analyze the audio and/or video content and instead communicates the collected data to the UE 301 for processing and analysis by the UE 301 and/or the gaming management platform 103 (FIG. 1). In some embodiments, the video sensors 317 are configured to recognize one or more of analog content or digital content.

In some embodiments, action figure 307 includes at least one core component package 318 that includes one or more of a gyroscope, a magnetometer, an accelerometer, a microphone, a camera, other suitable sensor, an RFID tag, a light source, a power source, a processor, a memory, a speaker, a vibration device, one or more motors, a temperature sensor, a heart rate sensor, a skin moisture content sensor, or other suitable component(s).

In some embodiments, action figure 307 is configured to recognize three-dimensional (3D) objects and to trigger various events or state changes within the action figure 307, the UE 301, and/or an accessory 309 based on the detection of the 3D object. For example, if the 3D object is determined to be in a predetermined proximity of a "flying" action figure 307, a user controlling the action figure 307 in the real world should pilot the action figure 307 to avoid the 3D object. If the action figure 307 "crashes" into the 3D object, then a life or power status of the action figure 307 is optionally changed. In some embodiments, the detection of a 3D object causes the action figure 307 to make audible sounds to perform a task related to the 3D object. In some embodiments, the video sensors 317 are configured to recognize 3D objects and/or video content. In some embodiments, the recognized 3D objects and/or video content causes a change in state of the action figure 307 and/or the physical accessory 309. For example, if the action figure 307 "crashes" into the 3D object, then the action figure 307 is optionally caused to vibrate, to lose a limb or feature such as a wing, for example, to drop the physical accessory 309, or to indicate a change in state by way of some other suitable effect.

In some embodiments, the action figure 307, the physical accessory 309 and/or the UE 301 is configured to superimpose a 3D augmented reality over the recognized 3D object(s) or a plane over the recognized 3D object(s). For example, in some embodiments, the action figure 309 comprises a projection device 319 usable to superimpose a 3D augmented reality onto an object. Alternatively or additionally, or more of the physical accessory 309 or the UE 301 comprise respective projection devices that are capable of individually or together with other projector devices, generate a 3D display. A 3D augmented reality is capable of enhancing a user's experience with the action figure 307, the physical accessory 309 and/or the UE 301. For example, if a user is playing a game that involves climbing a castle wall, one or more of the UE 301, the action figure 307, or the physical accessory 309 is configured to detect a piece of furniture in a room and to project a 3D augmented reality version of a castle wall onto the piece of furniture to enhance the gaming experience.

In some embodiments, the action figure 307 and/or the physical accessory 309 are configured to interact with the projected 3D augmented reality. For example, if the projection displays a falling boulder over the castle wall, then the action figure 307 is capable of being "hit" by the falling boulder in the context of the game. To determine if the action figure 307 is hit in the augmented reality, the UE 301 is configured to process orientation and movement data provided by the sensors of the action figure 307 and/or the physical accessory 309, and correlate the sensor data with information about the game being run by the UE 101. In some embodiments, the projected 3D augmented reality includes a character in the context of the game with which action figure 309 is capable of interacting in the real world and/or in the context of the game.

Figure 4:
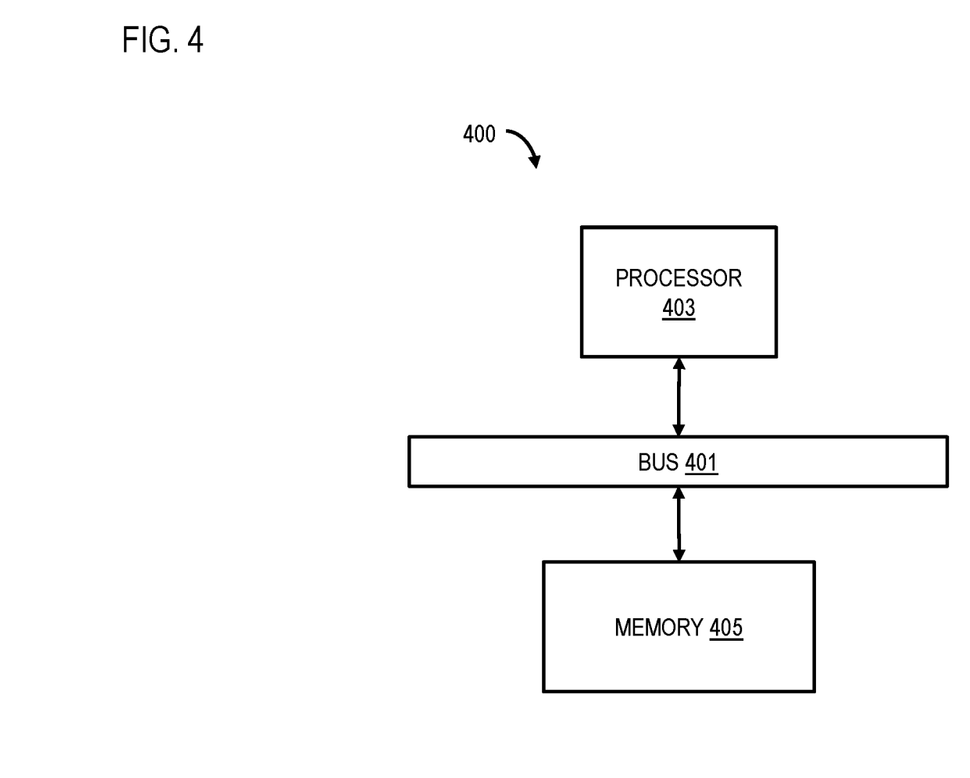
FIG. 4 is a functional block diagram of a computer or processor-based system upon which or by which some embodiments are implemented.

FIG. 4 is a functional block diagram of a computer or processor-based system 400 upon which or by which an embodiment is implemented.

Processor-based system 400 is programmed to facilitate interactions between an action figure, a physical accessory, and a virtual reality environment, as described herein, and includes, for example, bus 401, processor 403, and memory 405 components.

In some embodiments, the processor-based system is implemented as a single "system on a chip." Processor-based system 400, or a portion thereof, constitutes a mechanism for performing one or more steps of facilitating interactions between an action figure, a physical accessory, and a virtual reality environment.

In some embodiments, the processor-based system 400 includes a communication mechanism such as bus 401 for transferring information and/or instructions among the components of the processor-based system 400. Processor 403 is connected to the bus 401 to obtain instructions for execution and process information stored in, for example, the memory 405. In some embodiments, the processor 403 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor 403. Similarly, an ASIC is configurable to perform specialized functions not easily performed by a more general purpose processor. Other specialized components to aid in performing the functions described herein optionally include one or more field programmable gate arrays (FPGA), one or more controllers, or one or more other special-purpose computer chips.

In one or more embodiments, the processor (or multiple processors) 403 performs a set of operations on information as specified by a set of instructions stored in memory 405 related to facilitate interactions between an action figure, a physical accessory, and a virtual reality environment. The execution of the instructions causes the processor to perform specified functions.

The processor 403 and accompanying components are connected to the memory 405 via the bus 401. The memory 405 includes one or more of dynamic memory (e.g., RAM, magnetic disk, writable optical disk, etc.) and static memory (e.g., ROM, CD-ROM, etc.) for storing executable instructions that when executed perform the steps described herein to facilitate interactions between an action figure, a physical accessory, and a virtual reality environment. The memory 405 also stores the data associated with or generated by the execution of the steps.

In one or more embodiments, the memory 405, such as a random access memory (RAM) or any other dynamic storage device, stores information including processor instructions for facilitating interactions between an action figure, a physical accessory, and a virtual reality environment. Dynamic memory allows information stored therein to be changed by system 100. RAM allows a unit of information stored at a location called a memory address to be stored and retrieved independently of information at neighboring addresses. The memory 405 is also used by the processor 403 to store temporary values during execution of processor instructions. In various embodiments, the memory 405 is a read only memory (ROM) or any other static storage device coupled to the bus 401 for storing static information, including instructions, that is not changed by the system 100. Some memory is composed of volatile storage that loses the information stored thereon when power is lost. In some embodiments, the memory 405 is a non-volatile (persistent) storage device, such as a magnetic disk, optical disk or flash card, for storing information, including instructions, that persists even when the system 100 is turned off or otherwise loses power.

The term "computer-readable medium" as used herein refers to any medium that participates in providing information to processor 403, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

An aspect of this description relates to a method that comprises communicatively coupling a physical object with a body. One or more of the body or the physical object has connectivity to a computer having a processor. The method also comprises detecting a sound determined to match an audio fingerprint. The method further comprises setting a function of the physical object based on the audio fingerprint. The method additionally comprises generating a virtual representation of the physical object and the body in a virtual reality viewable by way of a display associated with the computer. Generation of the virtual representation of the physical object and the body includes orienting a virtual version of the physical object with respect to a virtual version of the body. The method also comprises causing the virtual version of the physical object to be usable in accordance with the function of the physical object.

Another aspect of this description relates to an apparatus that comprises at least one processor, and at least one memory including computer program code for one or more programs. The at least one processor is configured to execute an instruction from the at least one memory to cause the apparatus to communicatively couple a physical object with a body. One or more of the body or the physical object has connectivity to a computer having a processor. The apparatus is also caused to detect a sound determined to match an audio fingerprint. The apparatus is further caused to set a function of the physical object based on the audio fingerprint. The apparatus is additionally caused to generate a virtual representation of the physical object and the body in a virtual reality viewable by way of a display associated with the computer. Generation of the virtual representation of the physical object and the body includes orienting a virtual version of the physical object with respect to a virtual version of the body. The apparatus is also caused to cause the virtual version of the physical object to be usable in accordance with the function of the physical object.

A further aspect of this description relates to a method comprising detecting a sound determined to match an audio fingerprint. The method also comprises setting a function of one or more of a physical object or a body associated with the physical object. One or more of the physical object or the body has connectivity to a computer having a processor. The function is set based on the audio fingerprint. The method further comprises generating a virtual representation of the physical object and the body in a virtual reality viewable by way of a display associated with the computer. Generating the virtual representation of the physical object and the body includes orienting a virtual version of the physical object with respect to a virtual version of the body. The method additionally comprises causing one or more of the virtual version of the physical object or the virtual version of the body to be usable in accordance with the function of the physical object or the function of the body.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
    communicatively coupling a physical object with a body, one or more of the body or the physical object having connectivity to a computer having a processor;
    detecting a sound determined to match an audio fingerprint;
    setting a function of the physical object based on the audio fingerprint;
    generating a virtual representation of the physical object and the body in a virtual reality viewable by way of a display associated with the computer, wherein generating the virtual representation of the physical object and the body includes orienting a virtual version of the physical object with respect to a virtual version of the body; and
    causing the virtual version of the physical object to be usable in accordance with the function of the physical object;
    detecting a real-world three-dimensional object; and
    projecting an augmented reality onto the real-world three-dimensional object so as to cover the real-world three-dimensional object with the augmented reality, based on the detection of the real-world three-dimensional object.

2. The method of claim 1, further comprising:
    causing the body to be affected by an event that occurs in the three dimensional augmented reality,
    wherein the augmented reality is a superimposed texture projected onto the real-world three-dimensional object.

3. The method of claim 1, wherein the audio fingerprint is based on a learning algorithm configured to identify a speech pattern of a user of the body.

4. The method of claim 1, wherein the audio fingerprint is a key to unlocking content associated with the virtual reality, and the detection of the audio fingerprint causes content in a context of the virtual reality to be unlocked.

5. The method of claim 1, wherein the audio fingerprint is a key to triggering an event in the virtual reality, and the detection of the audio fingerprint causes the event to occur in the virtual reality.

6. The method of claim 1, further comprising:
    detecting the real-world three-dimensional object as being within a predetermined proximity of the body; and
    causing a status or behavior of the body to occur based on the detected presence of the real-world three-dimensional object based on the real-world three-dimensional object being within the predetermined proximity.

7. The method of claim 1, wherein the function of the physical object based on the audio fingerprint is a first function that lasts for a predetermined period of time after the detected sound is determined to match the audio fingerprint, and the method further comprises:
    detecting a contact position between the physical object and the body;
    setting a second function of the physical object based on the contact position; and
    causing the virtual version of the physical object to be usable in accordance with the second function of the physical object.

8. The method of claim 1, further comprising:
    continuously analyzing an audio stream to detect the sound determined to match the audio fingerprint.

9. The method of claim 8, further comprising:
    processing the audio stream to identify a hash of landmarks to recognize the audio fingerprint via a multi-variant search of the landmarks using an algorithm to eliminate ad hoc and distractive sound peaks.

10. The method of claim 1, wherein setting the function of the physical object causes the physical object to be in a power up mode, prompting a user of the body to interact with the virtual reality viewable by way of the display, and the method further comprises:
    transmitting a message to a designated recipient, indicating that the user is interacting with the virtual reality.

11. An apparatus comprising:
    at least one processor; and
    at least one memory including computer program code for one or more programs, the at least one processor configured to execute an instruction from the at least one memory to cause the apparatus to:
        communicatively couple a physical object with a body, one or more of the body or the physical object having connectivity to a computer having a processor;
        detect a sound determined to match an audio fingerprint;
        set a function of the physical object based on the audio fingerprint;
        generate a virtual representation of the physical object and the body in a virtual reality viewable by way of a display associated with the computer, wherein generating the virtual representation of the physical object and the body includes orienting a virtual version of the physical object with respect to a virtual version of the body;
        cause the virtual version of the physical object to be usable in accordance with the function of the physical object;
        detect a real-world three-dimensional object; and
        project an augmented reality onto the real-world three-dimensional object so as to cover the real-world three-dimensional object with the augmented reality, based on the detection of the real-world three-dimensional object.

12. The apparatus of claim 11, wherein the apparatus is further caused to:
    cause the body to be affected by an event that occurs in the three dimensional augmented reality,
    wherein the augmented reality is a superimposed texture projected onto the real-world three-dimensional object.

13. The apparatus of claim 11, wherein the audio fingerprint is based on a learning algorithm configured to identify a speech pattern of a user of the body.

14. The apparatus of claim 11, wherein the audio fingerprint is a key to unlocking content associated with the virtual reality, and the detection of the audio fingerprint causes content in a context of the virtual reality to be unlocked.

15. The apparatus of claim 11, wherein the audio fingerprint is a key to triggering an event in the virtual reality, and the detection of the audio fingerprint causes the event to occur in the virtual reality.

16. The apparatus of claim 11, wherein the apparatus is further caused to:
  detect the real-world three-dimensional object as being within a predetermined proximity of the body; and
  cause a status or behavior of the body to occur based on the detected presence of the real-world three-dimensional object based on the real-world three-dimensional object being within the predetermined proximity.

17. The apparatus of claim 11, wherein the function of the physical object based on the audio fingerprint is a first function that lasts for a predetermined period of time after the detected sound is determined to match the audio fingerprint, and the apparatus is further caused to:
  detect a contact position between the physical object and the body;
  set a second function of the physical object based on the contact position; and
  cause the virtual version of the physical object to be usable in accordance with the second function of the physical object.

18. The apparatus of claim 11, wherein the apparatus is further caused to:
  continuously analyze an audio stream received by a microphone included in one or more of the body or the physical object to detect the sound determined to match the audio fingerprint.

19. The apparatus of claim 18, wherein the apparatus is further caused to:
  process the audio stream to identify a hash of landmarks to recognize the audio fingerprint via a multi-variant search of the landmarks using an algorithm to eliminate ad hoc and distractive sound peaks.

20. A method comprising:
  detecting a sound determined to match an audio fingerprint;
  setting a function of one or more of a physical object or a body associated with the physical object, one or more of the physical object or the body having connectivity to a computer having a processor, the function being set based on the audio fingerprint;
  generating a virtual representation of the physical object and the body in a virtual reality viewable by way of a display associated with the computer, wherein generating the virtual representation of the physical object and the body includes orienting a virtual version of the physical object with respect to a virtual version of the body;
  causing one or more of the virtual version of the physical object or the virtual version of the body to be usable in accordance with the function of the physical object or the function of the body;
  detecting a real-world three-dimensional object;
  projecting an augmented reality onto the real-world three-dimensional object so as to cover the real-world three-dimensional object with the augmented reality, based on the detection of the real-world three-dimensional object; and
  causing the body to be affected by an event that occurs in the augmented reality, wherein
  the augmented reality is a superimposed texture projected onto the real-world three-dimensional object, and
  the event that occurs in the augmented reality is an animation of a moving virtual object over the superimposed texture projected onto the real-world three-dimensional object.

* * * * *